(12) United States Patent
Bojiuc

(10) Patent No.: US 10,230,292 B2
(45) Date of Patent: Mar. 12, 2019

(54) PERMANENT MAGNET OPERATING MACHINE

(75) Inventor: Dumitru Bojiuc, Marina Del Rey, CA (US)

(73) Assignee: CLEARWATER HOLDINGS, LTD, Marina Del Rey, CA (US)

( * ) Notice: Subject to any disclaimer, the term of this patent is extended or adjusted under 35 U.S.C. 154(b) by 543 days.

(21) Appl. No.: 13/121,113

(22) PCT Filed: Sep. 26, 2008
(Under 37 CFR 1.47)

(86) PCT No.: PCT/US2008/011170
§ 371 (c)(1),
(2), (4) Date: Jun. 8, 2012

(87) PCT Pub. No.: WO2010/036221
PCT Pub. Date: Apr. 1, 2010

(65) Prior Publication Data
US 2012/0286592 A1   Nov. 15, 2012

(51) Int. Cl.
*H02K 21/24* (2006.01)
*H02K 53/00* (2006.01)
(Continued)

(52) U.S. Cl.
CPC ............. *H02K 53/00* (2013.01); *H02K 21/24* (2013.01); *H02K 41/031* (2013.01); *H02K 49/108* (2013.01)

(58) Field of Classification Search
CPC ........ H02K 41/03; H02K 41/031; H02K 1/18; H02K 1/2713; H02K 7/09; H02K 7/106; H02K 7/14
(Continued)

(56) References Cited

U.S. PATENT DOCUMENTS 3,435,267 A   3/1969   Beyersdorf
4,185,366 A   1/1980   Gilbert
(Continued)

FOREIGN PATENT DOCUMENTS

CL         41.687       2/2017
CN     106233579 A     12/2016
(Continued)

OTHER PUBLICATIONS

International Search Report in International Application No. PCT/US2008/011170, dated Dec. 1, 2008 (1 page).
(Continued)

*Primary Examiner* — Thomas Truong
*Assistant Examiner* — Leda T Pham
(74) *Attorney, Agent, or Firm* — Nixon Peabody LLP

(57) ABSTRACT

A magnet machine may translate or rotate with one element stationary and another element moving. One element has mounted thereon a plurality of magnets arranged in a sequenced array extensive in the direction of operation, the magnets fixed with N-pole magnet faces opposing S-pole magnet faces across gaps between the magnets, and side faces arranged in a plane. A second element has a single or integrated magnet mounted with one pole face positioned parallel to, and gapped apart from the plane of the plurality of magnets. This pole face is disrupted by an array of spaced apart grooves. The direction of motion is in the plane. A solenoid may be mounted within one or more of the grooves so provide a staring force or a braking force to the moving element.

10 Claims, 3 Drawing Sheets

(51) Int. Cl.
*H02K 41/03* (2006.01)
*H02K 49/10* (2006.01)

(58) Field of Classification Search
USPC ................................. 310/12.24, 268, 156.01
See application file for complete search history.

(56) References Cited

U.S. PATENT DOCUMENTS

| | | | |
|---|---|---|---|
| 4,286,198 A | 8/1981 | de Valroger | |
| 4,370,577 A | 1/1983 | Wakabayashi | |
| 4,441,043 A | 4/1984 | DeCesare | |
| 4,458,228 A | 7/1984 | Baumgartner | |
| 4,542,323 A | 9/1985 | Doemen | |
| 4,563,602 A | 1/1986 | Nagasaka | |
| 4,568,862 A | 2/1986 | Tassinario | |
| 4,626,751 A | 12/1986 | Doemen | |
| 4,802,690 A | 2/1989 | Raidel | |
| 4,806,832 A | 2/1989 | Muller | |
| 4,924,156 A | 5/1990 | Muller | |
| 4,973,869 A | 11/1990 | Cho | |
| 5,038,083 A | 8/1991 | Muller | |
| 5,051,641 A | 9/1991 | Weh | |
| 5,117,142 A | 5/1992 | von Zweygbergk | |
| 5,128,570 A | 7/1992 | Isozaki | |
| 5,130,583 A | 7/1992 | Andoh | |
| 5,134,682 A | 7/1992 | Muller | |
| 5,142,181 A | 8/1992 | Newell | |
| 5,289,072 A | 2/1994 | Lange | |
| 5,474,799 A | 12/1995 | Thigpen | |
| 5,543,674 A | 8/1996 | Koehler | |
| 5,708,310 A | 1/1998 | Sakamoto | |
| 5,777,418 A | 7/1998 | Lange | |
| 5,838,079 A | 11/1998 | Morohashi | |
| 5,894,902 A | 4/1999 | Cho | |
| 5,942,828 A | 8/1999 | Hill | |
| 5,952,743 A | 9/1999 | Sidey | |
| 5,973,436 A | 10/1999 | Mitcham | |
| 5,977,684 A | 11/1999 | Lin | |
| 6,011,339 A | 1/2000 | Kawakami | |
| 6,043,579 A | 3/2000 | Hill | |
| 6,222,287 B1 | 4/2001 | Suzuki | |
| 6,414,408 B1 | 7/2002 | Erdman | |
| 6,492,758 B1 | 12/2002 | Gianni | |
| 6,700,267 B2 | 3/2004 | Weiss | |
| 6,710,581 B1 | 3/2004 | Lee | |
| 6,729,140 B2 | 5/2004 | Care | |
| 6,741,010 B2 | 5/2004 | Wilkin | |
| 6,798,089 B1 | 9/2004 | Smit | |
| 6,803,691 B2 | 10/2004 | Rose | |
| 6,847,135 B2 | 1/2005 | Kastinger | |
| 6,870,284 B2 | 3/2005 | Uchida | |
| 6,888,272 B2 | 5/2005 | Kastinger | |
| 6,924,574 B2 | 8/2005 | Qu | |
| 6,952,068 B2 | 10/2005 | Gieras | |
| 7,030,529 B2 | 4/2006 | Dommsch | |
| 7,067,942 B2 | 6/2006 | Korenaga | |
| 7,124,495 B2 | 10/2006 | Gieras | |
| 7,164,220 B2 | 1/2007 | Gilmour | |
| 7,385,678 B2 * | 6/2008 | Dams | G03B 27/58 310/12.06 |
| 7,466,058 B2 | 12/2008 | Dubois | |
| 7,492,074 B1 | 2/2009 | Rittenhouse | |
| 7,579,742 B1 | 8/2009 | Rittenhouse | |
| 7,633,198 B2 | 12/2009 | Kirkman | |
| 7,652,406 B2 | 1/2010 | Kim | |
| 7,701,678 B2 | 4/2010 | Dooley | |
| 7,732,973 B2 * | 6/2010 | Bojiuc | H02K 1/06 310/156.01 |
| 7,755,244 B2 | 7/2010 | Ley | |
| 7,777,381 B2 | 8/2010 | Takeuchi | |
| 7,791,245 B1 | 9/2010 | Hao | |
| 7,812,500 B1 | 10/2010 | Ham | |
| 7,884,563 B2 | 2/2011 | Takeuchi | |
| 7,906,885 B2 | 3/2011 | Lu | |
| 7,944,107 B2 | 5/2011 | Thoms | |
| 7,944,112 B2 | 5/2011 | Kim | |
| 7,960,893 B2 | 6/2011 | Kim | |
| 7,986,069 B2 | 7/2011 | Takeuchi | |
| 7,990,019 B2 | 8/2011 | Sung | |
| 8,053,946 B2 | 11/2011 | Koizumi | |
| 8,058,763 B2 | 11/2011 | Clark | |
| 8,067,863 B2 * | 11/2011 | Giovanardi | H02K 41/031 310/12.22 |
| 8,074,922 B2 | 12/2011 | Bojiuc | |
| 8,084,879 B2 | 12/2011 | Stiesdal | |
| 8,089,175 B2 | 1/2012 | Stiesdal | |
| 8,106,563 B2 | 1/2012 | Ritchey | |
| 8,110,961 B2 | 2/2012 | Hsu | |
| 8,115,361 B2 | 2/2012 | Iki | |
| 8,154,146 B2 | 4/2012 | Fischer | |
| 8,159,104 B1 | 4/2012 | Bojiuc | |
| 8,169,109 B2 | 5/2012 | Sykes | |
| 8,188,633 B2 | 5/2012 | Quere | |
| 8,207,644 B2 | 6/2012 | Himmelmann | |
| 8,207,648 B2 | 6/2012 | Li | |
| 8,212,445 B2 | 7/2012 | Ritchey | |
| 8,232,695 B2 | 7/2012 | Bojiuc | |
| 8,258,782 B2 | 9/2012 | Kaita | |
| 8,264,120 B2 | 9/2012 | Hsu | |
| 8,274,191 B2 | 9/2012 | Stiesdal | |
| 8,278,872 B2 | 10/2012 | Li | |
| 8,283,813 B2 | 10/2012 | Gilchrist | |
| 8,288,916 B2 | 10/2012 | Quere | |
| 8,294,322 B2 | 10/2012 | Aiki | |
| 8,299,676 B2 | 10/2012 | Miyata | |
| 8,330,404 B2 | 12/2012 | Sakai | |
| 8,334,634 B2 | 12/2012 | Palmer | |
| 8,339,009 B2 | 12/2012 | Mueller | |
| 8,344,567 B2 | 1/2013 | Kamiki | |
| 8,350,442 B2 | 1/2013 | Akutsu | |
| 8,354,768 B2 | 1/2013 | Cipriani | |
| 8,358,046 B2 | 1/2013 | Platon | |
| 8,373,319 B1 | 2/2013 | Barnes | |
| 8,381,389 B2 | 2/2013 | Lisi | |
| 8,390,168 B2 | 3/2013 | Hsu | |
| 8,432,081 B2 | 4/2013 | Wang | |
| 8,436,507 B2 | 5/2013 | Chien | |
| 8,482,171 B2 | 7/2013 | Edwards | |
| 8,536,751 B2 | 9/2013 | Cipriani | |
| 8,536,758 B2 | 9/2013 | Lisi | |
| 8,546,988 B2 | 10/2013 | Bright | |
| 2002/0130655 A1 | 9/2002 | Okada | |
| 2003/0011455 A1 | 1/2003 | Wakuda | |
| 2003/0025417 A1 | 2/2003 | Rose | |
| 2003/0102770 A1 | 6/2003 | Laskaris | |
| 2003/0127917 A1 | 7/2003 | Kang | |
| 2003/0173836 A1 * | 9/2003 | Inagaki | H02K 33/16 310/14 |
| 2003/0230946 A1 | 12/2003 | Durham | |
| 2004/0061397 A1 | 4/2004 | Rose | |
| 2004/0155535 A1 * | 8/2004 | Hashimoto | H02K 41/03 310/12.24 |
| 2004/0155548 A1 | 8/2004 | Rasmussen | |
| 2004/0239199 A1 | 12/2004 | Qu | |
| 2004/0251759 A1 | 12/2004 | Hirzel | |
| 2005/0104456 A1 | 5/2005 | Yajima | |
| 2005/0179336 A1 | 8/2005 | Hasebe | |
| 2006/0022564 A1 | 2/2006 | Kinashi | |
| 2006/0038456 A1 | 2/2006 | Bojiuc | |
| 2006/0043821 A1 | 3/2006 | Kojima | |
| 2006/0192453 A1 | 8/2006 | Gieras | |
| 2007/0216249 A1 | 9/2007 | Gruendel | |
| 2007/0228860 A1 | 10/2007 | Rao | |
| 2007/0247017 A1 | 10/2007 | Bumby | |
| 2007/0267929 A1 | 11/2007 | Pulnikov | |
| 2008/0048505 A1 | 2/2008 | Moriyama | |
| 2008/0122311 A1 | 5/2008 | Werst | |
| 2008/0136272 A1 | 6/2008 | Ishikawa | |
| 2008/0211326 A1 | 9/2008 | Kang | |
| 2008/0246362 A1 | 10/2008 | Hirzel | |
| 2008/0278020 A1 | 11/2008 | Ley | |
| 2009/0026869 A1 | 1/2009 | Kaehler | |
| 2009/0102305 A1 | 4/2009 | Lu | |
| 2009/0108712 A1 | 4/2009 | Holtzapple | |

(56) References Cited

U.S. PATENT DOCUMENTS

| | | |
|---|---|---|
| 2009/0243413 A1 | 10/2009 | Gilchrist |
| 2010/0101879 A1 | 4/2010 | McVickers |
| 2010/0327787 A1 | 12/2010 | Sakai |
| 2011/0058967 A1 | 3/2011 | Arita |
| 2011/0109190 A1 | 5/2011 | Aoyama |
| 2011/0234033 A1 | 9/2011 | Filatov |
| 2012/0228977 A1 | 9/2012 | Petro |
| 2012/0299405 A1 | 11/2012 | Li et al. |
| 2012/0299430 A1 | 11/2012 | Pennander |
| 2012/0306212 A1 | 12/2012 | Munoz |
| 2013/0270955 A1 | 10/2013 | Lillington |
| 2014/0191612 A1 | 7/2014 | Mariotto |

FOREIGN PATENT DOCUMENTS

| | | |
|---|---|---|
| DE | 3142913 A1 | 5/1983 |
| DE | 10037787 A1 | 3/2002 |
| EP | 2168225 A4 | 6/2015 |
| IN | 201627027705 A | 10/2016 |
| JP | S48-6323 A | 1/1973 |
| JP | S49-34082 | 9/1974 |
| JP | S455-160964 | 12/1980 |
| JP | H04-359656 A | 12/1992 |
| JP | 1994-005380 | 1/1994 |
| JP | 2001-211623 A | 8/2001 |
| JP | 2005/287103 A | 10/2005 |
| JP | 2006-280066 A | 10/2006 |
| KR | 16-130755 | 11/2016 |
| RU | 2 131 637 C1 | 6/1999 |
| TW | 200919903 S | 5/2009 |
| TW | 201444231 A | 11/2014 |
| TW | 201618438 | 5/2016 |
| WO | WO 91/07805 | 5/1991 |
| WO | WO 93/15547 A1 | 8/1993 |
| WO | WO 03/065554 A1 | 8/2003 |
| WO | WO 03/094328 A1 | 11/2003 |
| WO | WO 2006/117210 A1 | 11/2006 |
| WO | WO 2007/000054 A1 | 1/2007 |
| WO | WO 2009/009075 A1 | 1/2009 |
| WO | WO 2009/070333 A1 | 6/2009 |
| WO | WO 2016/014717 A1 | 1/2016 |

OTHER PUBLICATIONS

Extended European Search Report in European Patent Application No. 08816366.2, dated Sep. 24, 2013 (7 pages).

\* cited by examiner

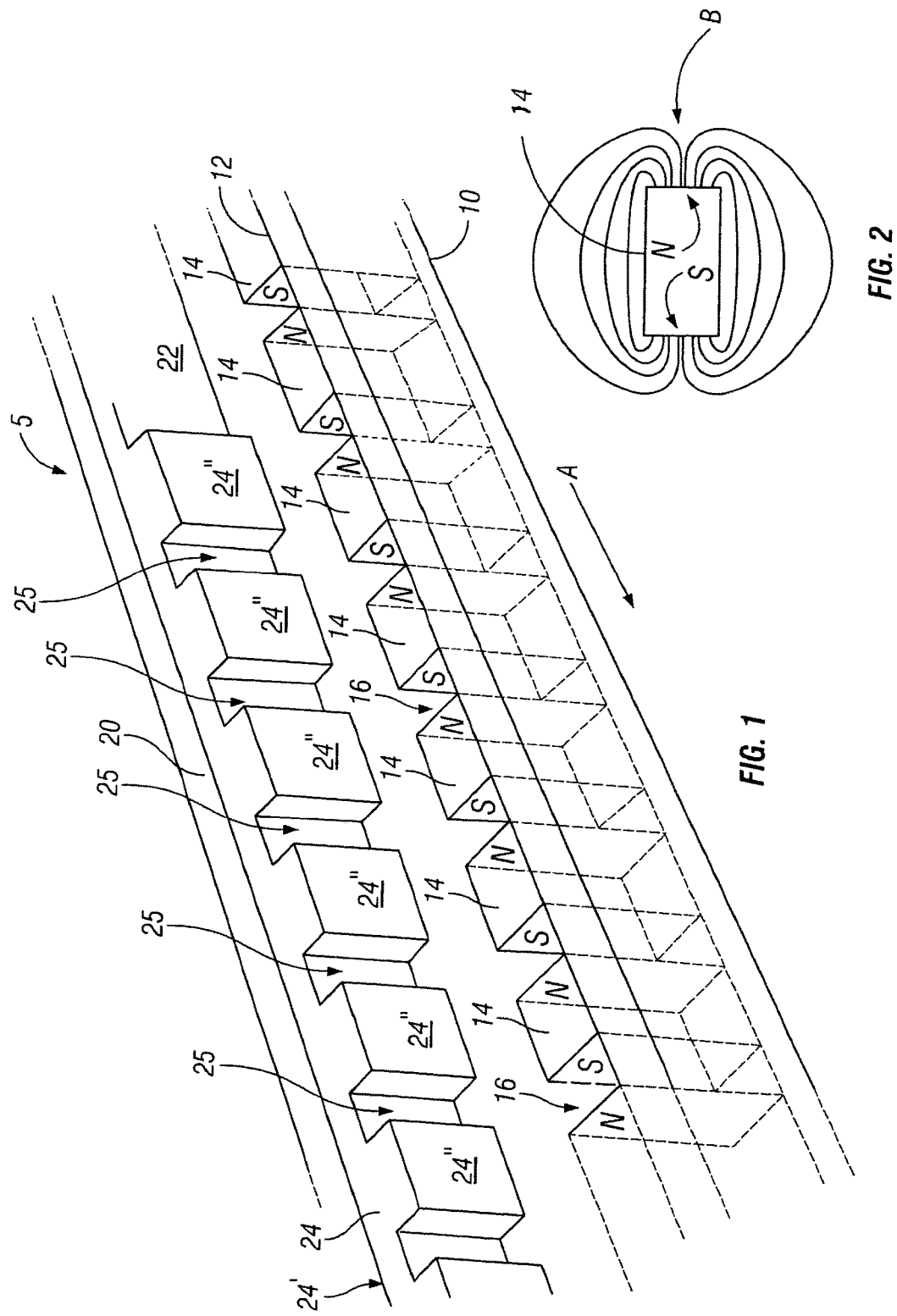

PERMANENT MAGNET OPERATING MACHINE

BACKGROUND OF THE INVENTION

Field of the Present Disclosure

This disclosure relates generally to magnetically operated devices and in particular to such a device that is operated in translational or rotational motion.

Description of Related Art

Moriyama et al, US 20080048505, discloses a coreless linear motor having a high rigidity, a high heat radiation effect, and a light weight is provided. The coreless linear motor includes a fixed member and a movable member moving relative with respect to the fixed member. The fixed member has a yoke and groups of permanent magnets arranged in the yoke. The movable member has a coil assembly. The groups of permanent magnets include first and second groups of permanent magnets arranged so as to face each other. Each of the first and second groups of permanent magnets has a plurality of magnets along a longitudinal direction of the yoke. In the plurality of magnets, magnetic poles of magnets facing along the longitudinal direction of the yoke alternate. Magnetic poles of the permanent magnets along the longitudinal direction of the yoke are the same. The coil assembly has at least three coils arranged movably relative to the first and second groups of permanent magnets along the longitudinal directions of the yoke between the first and second groups of permanent magnets, coils are arranged and wound in multiple layers in a solid state and fastened by a binder, and end surfaces of adjacent coils are connected via electrical insulation members. Preferably, a reinforcing member is provided as a non-magnetic member fit in the solid portions of the coils.

Kang et al, US 20030127917, discloses a transverse flux linear motor with permanent magnet excitation, which has a simple configuration as compared to systems using hydraulic or pneumatic pressure, or a rotary motor and a power transmission device, while being capable of generating high force, thereby achieving a high efficiency, as compared to conventional linear motors. The transverse flux linear motor includes a stator including stator cores and windings respectively wound around the stator cores and supplied with current, and a mover arranged at a central portion of the stator, the mover including mover cores and permanent magnets. Each of the permanent magnets is arranged between adjacent ones of the mover cores. Each stator core has a pair of column portions spaced apart from each other by a desired distance. The windings are arranged in pairs such that each of the winding pairs has two windings wound around respective column portions of an associated one of the stator cores. The two-phase transverse flux linear motor with permanent magnet excitation has two of a single phase motor units, that is, an A-phase motor unit and a B-phase motor unit, are arranged to face each other. A non-magnetic element for phase isolation is centrally arranged to prevent each of the A and B-phase motor units from being influenced by the magnetic circuit of the other. The stators of the A and B-phase motor units are arranged such that they are shifted from each other in order to reduce pulsations of thrust forces generated in the motor.

Korenaga et al, U.S. Pat. No. 7,067,942, discloses a linear motor including a coil, a plurality of first magnet groups having polar directions disposed in periodically different directions, and a plurality of second magnet groups having polar directions disposed in periodically different directions. In a set including a predetermined magnet of the first magnet groups and a magnet of the second magnet groups, corresponding to the predetermined magnet, magnetization directions of the set of magnets have mutually different tilts with respect to the central axis of the coil. The coil includes a first coil effective to produce a Lorentz's force between the first coil and the first magnet groups, and a second coil effective to produce a Lorentz's force between the second coil and the second magnet groups.

Qu et al, U.S. Pat. No. 6,924,574, discloses a novel dual-rotor, radial-flux, toroidally-wound, permanent-magnet machine. The present invention improves electrical machine torque density and efficiency. At least one concentric surface-mounted permanent magnet dual-rotor is located inside and outside of a torus-shaped stator with back-to-back windings, respectively. The machine substantially improves machine efficiency by reducing the end windings and boosts the torque density by at least doubling the air gap and optimizing the machine aspect ratio.

Uchida, U.S. Pat. No. 6,870,284, discloses a linear motor including a magnet array having a plurality of first magnets arrayed such that polarization directions thereof are periodically opposite, and a plurality of second magnets arrayed such that polarization directions thereof are periodically opposite and intersect those of the first magnets. The linear motor further includes an electromagnetic coil disposed to oppose the magnet array to generate a Lorentz force in cooperation with the magnet array and a yoke integrated with the coil at a first side opposite to a second side of the coil disposed opposite to the magnet array.

Sakamoto et al, U.S. Pat. No. 5,708,310, discloses a permanent magnet type stepping motor wherein and that at least one pitch formed by two adjacent small pole teeth of each of stator magnetic poles is different from other pitch formed by other two adjacent small pole teeth of each of the stator magnetic poles, wherein the tooth width of at least one of the two adjacent small pole teeth forming the different pitch is made different from that of the remaining small pole teeth, each stator magnetic poles having at least four small pole teeth and wherein a rotor has a rotor magnetic pole having a plurality of small pole teeth arranged at equal pitches, facing said stator magnetic poles through a gap. A permanent magnet type stepping motor has a stator having n pieces of stator magnetic pole each having m pieces of pole tooth, and a rotor having a plurality of pole teeth arranged at equal pitches n is an integer not less than three, m is an even number not less than four, a pitch of the rotor pole.

Andoh, U.S. Pat. No. 5,130,583, discloses a linear motor that comprises: a stator constituting a running track and having a longitudinal direction; a movable body disposed on the stator and being linearly movable along said longitudinal direction of the stator; an end detection sensor for detecting a state that the movable body is positioned at around an end of the stator; a drive circuit for driving the movable body to move on the stator; a control circuit for controlling the drive circuit and outputting a drive signal to the drive circuit to move and stop the movable body; and an overrun prevention circuit for preventing the movable body from overrunning out of the stator. The overrun prevention circuit is connected from said end detection sensor.

Isozaki, U.S. Pat. No. 5,128,570, discloses a permanent magnetic type stepping motor which is suitably used in such office automation machines and apparatuses and which parameters are set to satisfy the following conditions: The magnetic poles for the stator be 6 in number and be arranged as equally spaced by an identical pitch. Each of the magnetic poles of the stator be provided on its tip end with pole teeth which are equal in pitch to the pole teeth of the rotor magnetic poles or the pitch is of the pole teeth of the stator magnetic poles and the pitch τR of the rotor should satisfy the following correlations. τs+180τR/(180±τR). 60/τs=m (where m+1, 2 . . . ) An angle σr made between one of the stator magnetic poles and adjacent one of the rotor magnetic poles satisfy a relationship Θr=120°/Z. The numbers of pole teeth in the rotor magnetic poles meet an equation Z=6n±4 (where n is a positive integer). The number of lead wires of the stepping motor is either one of 3, 6, 7 and 9.

Nagasaka, U.S. Pat. No. 4,563,602, discloses a permanent magnet type stepping motor. The rotor is made of a cylindrical laminated iron core whose outer periphery is toothed at an equal pitch, and the number of teeth is Nr. The stator is made of a laminated iron core whose inner periphery is formed so as to face the rotor at an air gap between the rotor and the stator. Thin plate permanent magnets are attached on the surface of the stator teeth facing the air gap. The permanent magnets are disposed at an equal pitch and polarized such that the polarities of adjacent pole pieces differ from each other. The number of pole pieces is Ns, and has a relation Ns=2(Nr.+−.Np), where Np is an integer more than 1. The stator grooves are half opened or closed and have multiphase 2 Np pole distributed windings.

Wakabayashi et al, U.S. Pat. No. 4,370,577, discloses a linear motor of which its mover and its stator have magnetic teeth and is arranged such that the mover can move linearly on the stator while maintaining a constant gap with respect to the stator. The motor has a permanent magnet which is long in the longitudinal direction of the stator and two cores which are stacked perpendicularly to the longitudinal direction of the stator with said permanent magnet between them. A plurality of coils, each of which are wound over the two cores and the permanent magnet and have a magnetization axis which is perpendicular to the longitudinal direction of the stator. Each of the two cores has n groups (wherein n is an integer) of magnetic teeth facing the stator and each of the n group of magnetic teeth is arranged such that the pitch of a tooth is constant and is the same as that of the magnetic teeth of the stator but the phases of the magnetic teeth of each group are different from each other.

The related art described above discloses several operating machines in both translational and rotational modes and which use permanent magnets for producing EMF. However, the prior art fails to disclose a coupled magnet machine that uses permanent magnets on a first element of the machine, the magnets oriented in the direction of motion in a N-S pole, gapped-spaced-apart arrangement and a magnet mounted on a second element with a pole surface parallel to the side of the first magnets. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

A magnet machine may translate or rotate with one element stationary and another element moving. One element has mounted thereon a plurality of magnets arranged in a sequenced array extensive in the direction of operation, the magnets fixed with N-pole magnet faces opposing S-pole magnet faces across gaps between the magnets, and side faces arranged in a plane. A second element has a single or integrated magnet mounted with one pole face positioned parallel to, and gapped apart from the plane of the plurality of magnets. This pole face is disrupted by an array of spaced apart grooves capable of eliminating the end effect of magnetic interplay during relative motion. The direction of motion is in the plane. A solenoid may be mounted within one or more of the grooves so provide a staring force or a braking force to the moving element.

A primary objective inherent in the above described apparatus and method of use is to provide advantages not taught by the prior art.

Another objective is to provide a magnetic machine capable of continuous operation driven by permanent magnet force interplay.

A further objective is to provide such a machine operating in linear translation.

A further objective is to provide such a machine operating in rotation.

A still further object is to provide such a machine having a solenoid circuit capable of starting and stopping the motion of the machine.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

FIG. 1 is a perspective view of the presently described apparatus in a linearly translating embodiment;

FIG. 2 is a plan view of a permanent magnet thereof showing its magnetic B field.

DETAILED DESCRIPTION OF THE INVENTION

Figure 3:
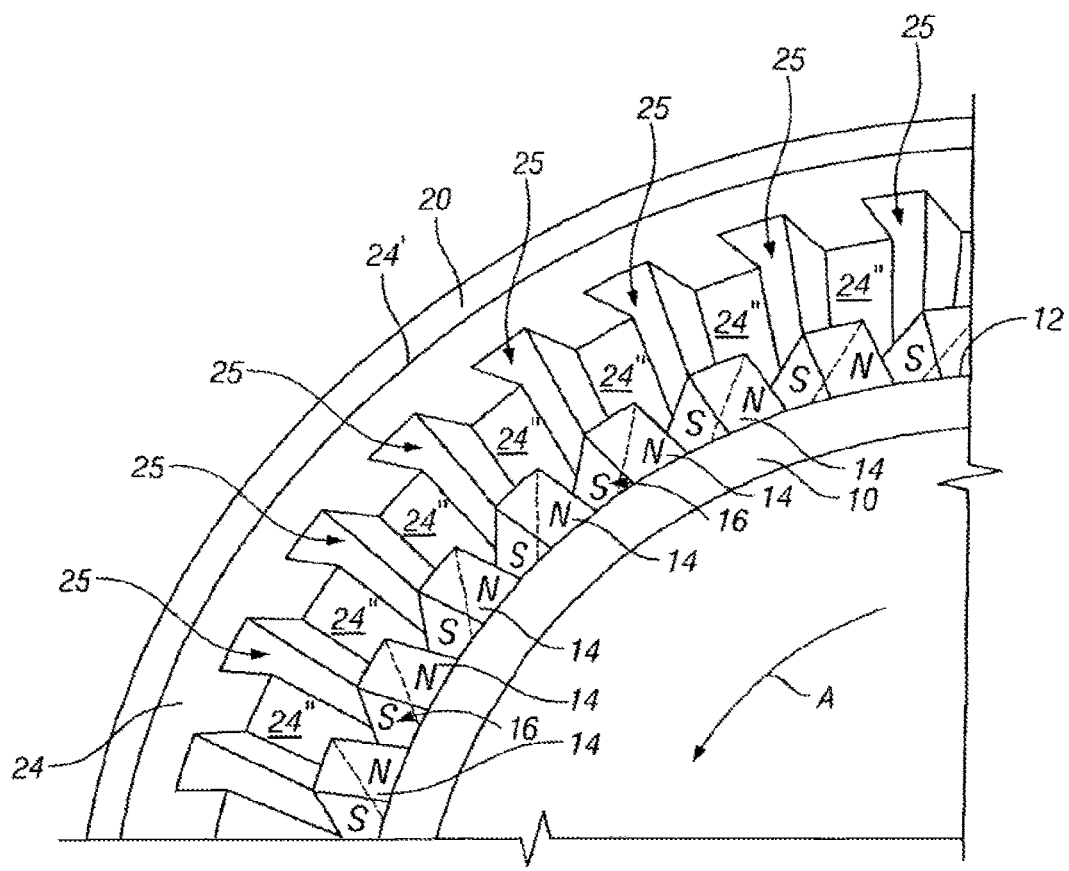
FIG. 3 is a partial perspective view of the presently described apparatus in a rotational embodiment.

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

Described now in detail, in a first embodiment of the present invention, is a permanent magnet operated machine 5 which is operative in a selected direction of operation denoted by arrow "A." The machine 5 may be constructed in alternative ways including as a linear translator and as a rotating device. Machine 5 employs two machine elements, a first machine element 10 and a second machine element 20. Both machine elements 10, 20 are extensive in the direction of operation "A," as shown in FIGS. 1 and 2 respectively.

Referring now to FIG. 1, first machine element 10 has a preferably planar first support surface 12 which faces laterally relative to the direction of operation "A". A plurality of first magnets 14 are arranged in a sequenced array extensive in the direction of operation. The first magnets 14 are fixed by bonding or other means to the first support surface 12 in an arrangement where north pole magnet faces "N" of the first magnets 14 oppose south pole magnet faces "S" of the first magnets 14 across gaps 16 between the first magnets 14. In FIG. 1 note that the magnetic pole faces are labeled with "S" or "N." Preferably, the first magnets 14 are rectangular in shape, each with N-pole and S-pole on opposing, mutually parallel faces of each magnet 14 thereby producing an external local magnetic field "B" extending between these faces, field "B" extending essentially parallel to the intermediate faces of each magnet 14 as shown in FIG. 2.

A second machine element 20 has a preferably planar second support surface 22 which faces laterally relative to the direction of operation "A". A second magnet 24 is extensive in the direction of operation "A", and is mounted on the second support surface 22 with a first magnet pole face 24' of the second magnet 24 in contact with the second support surface 22 and a second magnet pole face 24" of the second magnet 24 facing away, and spaced apart, from the second support surface 22. The second magnet 24 may be bonded or otherwise attached to the second support surface 22. The second magnet pole face 24" is disrupted by a sequenced array of grooves 25 therein, where the grooves 25 are preferably regularly spaced apart and the spacing and direction of the grooves 25 are preferably not coincident with the gaps 16 between first magnets 14.

As shown in the figures, the first 12 and second 22 support surfaces define parallel planes, and the second magnet pole face 24" of the second magnet 24 is in close proximity to the first magnets 14 for improved field interaction therebetween. FIG. 1 shows the proximity further then it would be for clarity of detail.

The first 10 and second 20 machine elements are engaged with a machine frame wherein one of the machine elements 10 or 20 is enabled to move in the direction of operation "A" relative to the other of the machine elements, where the other machine element is preferably held in a static position. Movement of one of the machine elements 10 or 20 may be linear, FIG. 1, or rotational, FIG. 3, where FIG. 3 shows a quadrant of the rotating machine as an example of the entire machine where the rotational axis is at the center of the circular structure. As shown, the sequenced array of the first magnets 14 may be linear when the direction of operation "A" is linear and then the gaps 16 between magnets 14 are parallel to each other, and the grooves in magnet 24 are also parallel to each other. Likewise, when the direction of operation "A" is circular, the gaps 16 between magnets 14 and the grooves in magnet 24 are near radial. As stated, in both the linear version shown in FIG. 1 and the radial version shown in FIG. 3, the gaps 16 and the grooves 25 are not coincident.

Figure 4:
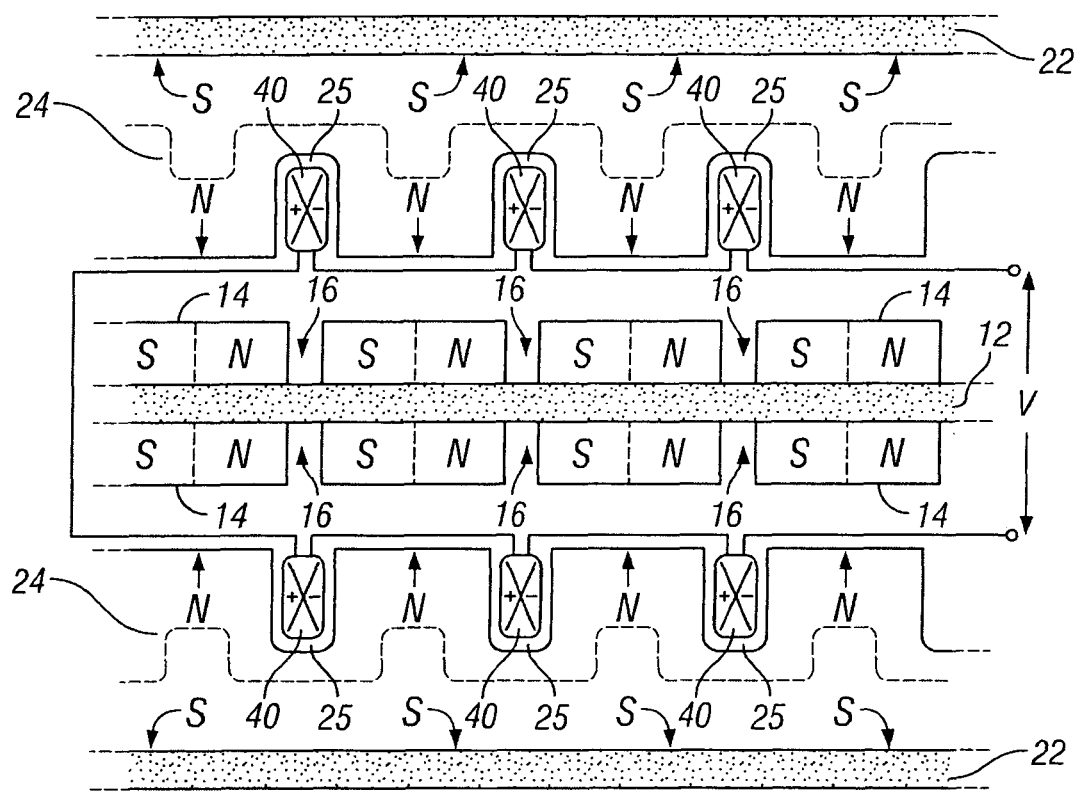
FIG. 4 is a schematic diagram of the presently described apparatus.

In a second embodiment of the present invention, construction is essentially identical with the linear and circular versions of the first embodiment described above, but with at least one of the grooves 25 in the second magnet containing a solenoid 40, the solenoid 40 having a multi-turn coil of conductive wire wrapped around a metallic core so as to produce a magnetic field when an electric current is passed through the wire. Preferably, such a solenoid 40 is fixed within all, most, or at least some of the grooves 25, and all said solenoids 40 are electrified in series interconnection, as shown in FIG. 4. In this embodiment, then, the second machine element 20 is stationary and the first machine element 10 is mounted for moving relative to the second machine element 20. Referring now to FIG. 4, we see a schematic version of the previously described first embodiment wherein FIG. 4 is representative of either a linear machine or a rotational machine showing only a portion of these machines as viewed in plan view with respect to the linear version and as viewed from an edge with respect to the circular version. Here we see solenoids 40 mounted within each groove 25 and interconnected in electrical series interconnection.

In operation, the present invention creates a magnetic motive force (MMF), as shown by arrow "A" in FIG. 4 which indicates the direction in which the moving element of the machine translates or rotates. This MMF is produced by magnetic attraction and repulsion between the magnets 14 and 24. It is noted, with respect to FIG. 2, as shown in FIG. 4 that the "B" field is essentially parallel to magnets 14 along their side faces which are parallel to the adjacent pole face of magnet 24. This produces little or no attractive or repulsive MMF. It is also noted that within each of the gaps 25 the magnetic field is interrupted, so that at the geometric center of the gap, a Gauss meter indicates zero magnetic field, and this fact provides for cancellation of any magnetic end-effect so that there is no MMF generated with respect to the gaps 25. Gaps 25 function to cancel the end effect which would otherwise tend to produce a magnetic drag on the moving element. Because of the orientation of magnets 14 relative to magnet 24, as shown in schematic FIG. 4, the effective MMF is produced by attractive forces between south pole faces of magnets 14 with the north pole face of magnet 24, and preferentially in the direction of motion "A" and also by repulsive forces between the north pole faces of magnets 14 with the north pole face of magnet 24, again preferentially in the direction of travel. The net response of magnets 14 north poles to magnet 24 is repulsion and of their south poles is attraction. Once rotation has been started in the first embodiment of the present invention it will tend to accelerate until friction and wind resistance balances the MMF. Thereafter, the machine will tend to stay in continuous motion until magnetic forces diminish naturally or until the moving element is manually stopped. It is worthy to note that for smooth operation, the gaps 16 between magnets 14 should be non-parallel relative to the grooves 25 in magnet 24 and there should be a spacing differential as well. In the second embodiment, the embedded solenoids are oriented to add to, or subtract from the MMF field "B" so that it is possible to start or stop the moving element of the present invention by increasing or decreasing the applied voltage "V" or by reversing its polarity.

Further details relating to the construction and deployment of the preferred embodiments described above, as for instance: supporting frames, bearing mounts, attachments of electrical wiring to electrical components and other features not described above are found in US 2008/0048505 to Moriyama, U.S. Pat. No. 7,067,942 to Korenaga et al, U.S. Pat. No. 6,870,284 to Uchida, and U.S. Pat. No. 5,130,583 to Andoh for linear mechanisms; and in U.S. Pat. No. 6,924,574 to Qu et al., and U.S. Pat. No. 5,708,310 to Sakamoto et al, and in U.S. Pat. No. 5,128,570 to Isozaki, the relevant disclosures of which are included by reference thereto as if fully set forth herein.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A magnet machine operative in a direction of operation, the magnet machine comprising:
   a first machine element extending in the direction of operation, the first machine element having a first support surface facing laterally relative to the direction of operation;
   a plurality of first magnets arranged in a sequenced array extending in the direction of operation, each of the plurality of first magnets coupled to the first support surface and having an N-pole magnet face opposing an S-pole magnet face of an adjacent one of the plurality of first magnets across gaps between adjacent ones of the plurality of first magnets;
   a second machine element extending in the direction of operation, the second machine element having a second support surface facing laterally relative to the direction of operation;
   a second magnet extending in the direction of operation and coupled to the second support surface, the second magnet including a first magnet pole face in contact with the second support surface and a second magnet pole face facing away and spaced apart from the second support surface, the second magnet pole face having a sequenced array of grooves defined therein; and
   a plurality of solenoids, each of the plurality of solenoids being mounted in a respective one of the sequenced array of grooves in the second magnet, the plurality of solenoids being electrified in series interconnection;
   wherein the first machine element and the second machine element are each coupled to a machine frame such that at least one of the first machine element or the second machine element is enabled to move in the direction of operation relative to the other of the machine elements.

2. The magnet machine of claim 1, wherein at least one of the first machine element or the second machine element is configured to move in a linear direction or a circular direction.

3. The magnet machine of claim 1, wherein the sequenced array of the plurality of first magnets extends in a linear direction or a circular direction.

4. The magnet machine of claim 1, wherein the sequenced array of grooves in the second magnet extends in a linear direction or a circular direction.

5. The magnet machine of claim 1, wherein the gaps between adjacent ones of the plurality of first magnets are non-aligned with the grooves defined in the second magnet.

6. A magnet machine operative in a direction of operation, the magnet machine comprising:
   a first machine element extending in the direction of operation, the first machine element having a first support surface and a second support surface, the first support surface facing in a first direction laterally relative to the direction of operation, the second support surface facing in a second direction laterally relative to the direction of operation, the second direction opposing the first direction;
   a plurality of first magnets arranged in a sequenced array extending in the direction of operation, each of the plurality of first magnets coupled to the first support surface of the first machine element and having an N-pole magnet face opposing an S-pole magnet face of an adjacent one of the plurality of first magnets across gaps between adjacent ones of the plurality of first magnets;
   a plurality of second magnets arranged in a sequenced array extending in the direction of operation, each of the plurality of second magnets coupled to the second support surface of the first machine element and having an N-pole magnet face opposing an S-pole magnet face of an adjacent one of the plurality of second magnets across gaps between adjacent ones of the plurality of second magnets;
   a second machine element extending in the direction of operation, the second machine element defining a first support surface and a second support surface, the first support surface of the second machine element facing the first support surface of the first machine element and facing in the second direction laterally relative to the direction of operation, the second support surface of the second machine element facing the second support surface of the first machine element and facing in the first direction laterally relative to the direction of operation;
   a third magnet extending in the direction of operation and coupled to the first support surface of the second machine element, the third magnet having a first magnet pole face in contact with the first support surface of the second machine element and a second magnet pole face spaced apart from the first support surface of the second machine element and facing in the second direction towards the first support surface of the first machine element, the second magnet pole face of the third magnet including a sequenced array of grooves defined therein;
   a fourth magnet extending in the direction of operation and coupled to the second support surface of the second machine element, the fourth magnet having a first magnet pole face in contact with the second support surface of the second machine element and a second magnet pole face spaced apart from the second support surface of the second machine element and facing in the first direction towards the second support surface of the first machine element, the second magnet pole face of the fourth magnet including a sequenced array of grooves defined therein, the sequenced array of grooves of the fourth magnet extending in the direction of operation;

a first solenoid mounted in one of the sequenced array of grooves defined in the third magnet and a second solenoid mounted in one of the sequenced array of grooves defined in the fourth magnet;

wherein the first machine element and the second machine element are each coupled to a machine frame such that at least one of the first machine element or the second machine element is enabled to move in the direction of operation relative to the other of the machine elements.

7. The magnet machine of claim 6, wherein at least one of the first machine element or the second machine element is configured to move in a linear direction or a circular direction.

8. The magnet machine of claim 6, wherein both the sequenced array of the plurality of first magnets and the sequenced array of the plurality of second magnets extend in a linear direction or a circular direction.

9. The magnet machine of claim 6, wherein both the sequenced array of grooves in the third magnet and the sequenced array of grooves in the fourth magnet extend in a linear direction or a circular direction.

10. The magnet machine of claim 6, wherein the gaps between adjacent ones of the plurality of first magnets are non-aligned with the grooves defined in the third magnet, and the gaps between adjacent ones of the plurality of second magnets are non-aligned with the grooves defined in the fourth magnet.

* * * * *